Patented Feb. 8, 1927.

1,616,741

UNITED STATES PATENT OFFICE.

OSCAR A. CHERRY, OF WAUWATOSA, WISCONSIN, ASSIGNOR TO THE CUTLER-HAMMER MFG. CO., OF MILWAUKEE, WISCONSIN, A CORPORATION OF WISCONSIN.

NOVEL COMPOSITION OF MATERIAL.

No Drawing.  Application filed June 18, 1923. Serial No. 646,233.

This invention relates to novel compositions of material and to processes of production thereof.

More particularly this invention relates to materials and processes adapted but not limited to the plastic art.

An object of the invention is that of providing novel compositions of material adapted to the plastic art among others, and possessing for use therein numerous advantages not exhibited by materials ordinarily employed.

Another object is that of providing advantageous processes of producing and utilizing such novel compositions of material.

Other objects and advantages will hereinafter appear.

Recently there have been developed and utilized in the plastic art and elsewhere certain resinous substances produced from interaction of, on the one hand, certain hydrocarbonaceous or other organic bodies, and, on the other hand, certain of the halogen derivatives of elements in the sixth group of the periodic system, such as sulphur, selenium, or equivalent substances. I shall hereinafter refer to such substances as "elements of the sulphur type".

These products, or certain of the same, have proven of surpassing importance and value both industrially and commercially whereas the products herein contemplated, while bearing some apparent analogy thereto, have been found to possess, at least for many purposes, numerous and decided advantages thereover.

The products herein contemplated comprise substances, in general viscid, gummy or resinous in character, produced from an organic body, a halogen derivative of an element of the sulphur type, and another substance comprising or capable of furnishing an additional quantity or additional quantities of the same or a different element or different elements of the sulphur type.

The organic bodies which have been found to lend themselves advantageously to production of the herein contemplated products are in general hydrocarbons although certain other organic substances of great importance commercially are also applicable herein. The aforementioned halogen derivatives of elements of the sulphur type may advantageously comprise chlorides, bromides or other halogen derivatives of such elements, whereas the additional substance mentioned may also comprise, or be capable of furnishing either the same or a different element or different elements of the sulphur type as aforecharacterized.

While, as aforeindicated, the range of substances which are adapted to act as constituents or components of the herein contemplated products is exceedingly wide, the proportioning of the various ingredient, constituent or component substances may also be varied rather widely. Further, while chemical reaction is involved in production of the herein contemplated products, no limitations concerning the exact nature or extent of any such reaction or reactions are to be imputed except as specifically stated herein.

In performance of the present processes the constituent or component substances are brought together in given proportions and in a predetermined or desired order and under thermic and other conditions suitable for promoting or otherwise influencing or controlling the particular reactions involved. Moreover, the physical and other properties of the product may be predetermined, controlled and varied by suitable selection and control of the aforementioned factors and others, including the character of the constituent or component substances employed and the time during which the imposed conditions are caused or permitted to continue.

As typical of a preferred procedure in producing the herein contemplated product the following steps may be recited: 200 parts of sulphur monochloride having dissolved therein substantially 50 parts of sulphur is brought together with approximately 100 parts of phenol, reaction being spontaneous and tending to be even violent, thus necessitating or rendering desirable the addition of one agent slowly and in small portions to the other, each portion so added being permitted to react before subsequent addition is made.

The resultant product is usually in the form of a resinous substance which is well adapted to the plastic and other arts, including those to which the aforementioned products have heretofore been applied.

While the aforerecited proportions are desirable and advantageous, it is nevertheless to be understood that the same are capable of relatively wide variation dependent upon the properties desired in the final product. Thus in practice, it has been found that the aforementioned proportion of sulphur may be increased, for example, up to 150 parts or even beyond and since sulphur is not readily soluble in sulphur monochloride in such proportions it is in such and similar cases desirable that part or even all of the sulphur or the like be mixed with the phenol rather than the sulphur chloride, particularly where relatively high proportions of the sulphur or its equivalent are employed.

As exemplary of cases wherein other elements of the sulphur type are employed the following may be cited: 300 parts of sulphur monochloride having dissolved therein substantially 50 parts of selenium is brought together with 100 parts of phenol, whereupon reaction ordinarily occurs spontaneously and vigorously thus practically requiring addition of one substance to the other slowly and in small portions.

The resultant product comprises an industrially useful resinous substance having physical and other properties quite analogous to those of the product aforedescribed.

As a variant of the foregoing the following steps may be enacted: 175 parts of sulphur monochloride to which has been added 63 parts of sulphur and a mixture comprising approximately 85 parts of phenol mixed with 15 parts of commercial or unrefined anthracene may be brought together in a manner in all essential respects similar to that just described for producing a product having analogous appearance and properties and also adapted to like uses.

As a further variant 100 parts of naphthalene may be heated to or preferably slightly above the melting temperature thereof and 150 parts of sulphur added to and incorporated therein. This mixture may be caused to react with 125 parts of sulphur monochloride for production of a product similar in certain respects to those aforedescribed.

Since the reaction last described does not ordinarily occur spontaneously, it is desirable or even necessary to employ activation preferably including both chemical and thermic or other physical activation. For such purpose a relatively small quantity of iron or other of the substances adapted to activate the present and similar reactions may be introduced preferably into the naphthalene prior to mixture with the other ingredients. Also heating of the reaction mixture is preferably employed. Again the action may be facilitated and the product improved by repeated addition of portions of the sulphur chloride to the reaction mixture. Thus for initiation of the action it is preferable though not absolutely essential that approximately one-third, that is to say, 42 parts of the sulphur chloride be first brought into contact with all or less than the total quantity of the other ingredients under the aforementioned activation and when the resultant action has proceeded to apparent completion the remainder of the sulphur chloride may be added in a number of distinct portions, as for example five, each portion being similarly permitted to react before addition of the next.

In certain cases where especially accurate control of the properties, including for example thermo-plasticity and the like, of the product is desired, I have found it advisable to subject the product of the procedure just described to a further treatment which may comprise strong heating, as for example to about 400 degrees F., which heating may be preferably continued for a period of approximately one hour or even longer until the product when subjected to proper tests is found to exhibit suitable or desired characteristics.

As exemplary of cases wherein organic bodies other than hydrocarbons are employed: 150 parts of sulphur monochloride having dissolved therein about 50 parts of sulphur may be brought into contact with an organic body comprising 25 parts of rosin and 75 parts of phenol, in a manner similar to that aforedescribed for production of a resinous product having somewhat analogous properties and characteristics.

The products of the foregoing exemplary procedures, while of course differing from one another in certain respects, nevertheless present generally the following common characteristics which moreover serve to distinguish the same from the more or less analogous products heretofore produced and utilized as aforementioned, that is to say, the present products are in general of considerably greater plasticity and are when in the solid state and particularly when mixed with certain fillers under comparable conditions, of markedly higher mechanical strength than the corresponding earlier mentioned products.

Moreover a certain relation appears to exist between such mechanical strength and the degree of thermo-plasticity of the present products when mixed with fillers and in a solid state. Thus as aforeindicated where high mechanical strength coincident with relatively increased thermo-plasticity is desired in the product the quantities of the sulphur or its equivalent will be increased, whereas in cases wherein such increased thermo-plasticity is unnecessary or undesirable the proportion of the sulphur or its equivalent may be somewhat reduced.

Moreover I have discovered that, if desired, the thermo-plasticity of the product may be relatively reduced without corresponding reduction in the content of sulphur or its equivalent by incorporation at a predetermined stage or stages of certain suitable substances.

Thus, if, in the first of the foregoing examples, approximately 25 parts of glycerine be added to the phenol prior to reaction the thermo-plasticity of the product may be maintained low although the full quantity of sulphur mentioned, that is to say, 50 parts, be employed, whereas I have found that if such quantity of sulphur or its equivalent be increased to or even beyond 75 parts the thermo-plasticity of the product is not greatly increased.

Also in many cases, particularly in the case of the reaction involving naphthalene, the thermo-plasticity and the like may be varied to a considerable extent by subjecting the product, preferably prior to incorporation with the filler material, to strong heat treatment as described.

It is of course to be understood that the proportions stated in the foregoing examples are capable, in general, of considerable variation either without material change in characteristics of the product or in certain cases for purposes of modification of the product, whereas the various terms herein employed are intended to embrace not only the substances specifically covered thereby, but also to include all the corresponding substances which for the purposes herein contemplated may fairly be regarded as equivalents.

While the various products aforedescribed are adapted generally to uses within the plastic art the same are as aforeindicated peculiarly adapted to use in conjunction with a suitable filler material, such mixture being adapted to molding under pressure either hot or cold and particularly in accordance with certain of the known hot molding practices.

Such products have been found in general to exhibit practically all of the desired characteristics of many of the better known and more expensive and difficultly workable products heretofore employed for like purposes, the present products being adapted to take exceedingly sharp impressions and possessing generally improved properties both during working and when in the finished state.

It is of course to be understood that the additional quantity of sulphur or its equivalent need not comprise an elemental substance or elemental substances, but on the contrary certain of the compounds, comprising or capable of furnishing an element or elements of the sulphur type may be employed herein, whereas under certain conditions and for particular purposes certain of such compounds have been found to be highly advantageous.

In the absence of a generic term, I have used the word "sulphur" in the appended claims to designate sulphur, selenium, or other substantially equivalent element or elements having the desired characteristics, in the sixth group of the periodic system.

What I claim as new and desire to secure by Letters Patent is:—

1. A reaction product of sulphur, sulphur chloride and an aromatic body, such aromatic body being characterized by its ability to form a resin with sulphur.

2. A reaction product of elemental sulphur, sulphur monochloride and an aromatic body, such aromatic body being characterized by its ability to form a resin with sulphur.

3. A resinous reaction product of sulphur, sulphur chloride and naphthalene.

4. A resin which is the product of reaction, under activation of heat and a chemical agent, of sulphur, sulphur chloride and naphahtlene.

5. The process of producing a resinous product, which comprises simultaneously reacting with sulphur and sulphur chloride on an aromatic body capable of forming therewith a sulphur resin.

6. The process of producing an industrially useful resin, which comprises effecting reaction, under activation of heat and a chemical agent, of sulphur, sulphur chloride and naphthalene.

In witness whereof I have hereunto subscribed my name.

OSCAR A. CHERRY.